United States Patent
Wu et al.

(10) Patent No.: US 12,333,134 B2
(45) Date of Patent: Jun. 17, 2025

(54) ARRAY SUBSTRATE WITH NFC COIL, HANDWRITING TABLET INCLUDING THE SAME, AND METHOD FOR DRIVING HANDWRITING TABLET

(71) Applicants: Beijing BOE Optoelectronics Technology Co., Ltd., Beijing (CN); BOE Technology Group Co., Ltd., Beijing (CN)

(72) Inventors: Xiaojuan Wu, Beijing (CN); Jian Wang, Beijing (CN); Yu Zhao, Beijing (CN); Yang Ge, Beijing (CN); Xian Wang, Beijing (CN); Jiaxing Wang, Beijing (CN); Chunnan Feng, Beijing (CN); Jinshuai Duan, Beijing (CN); Xiuliang Wang, Beijing (CN); Biqi Li, Beijing (CN); Feng Qu, Beijing (CN)

(73) Assignees: Beijing BOE Optoelectronics Technology Co., Ltd., Beijing (CN); BOE Technology Group Cp., Ltd., Beijing (CN)

( * ) Notice: Subject to any disclaimer, the term of this patent is extended or adjusted under 35 U.S.C. 154(b) by 0 days.

(21) Appl. No.: 17/916,019

(22) PCT Filed: Sep. 28, 2021

(86) PCT No.: PCT/CN2021/121359
§ 371 (c)(1),
(2) Date: Sep. 29, 2022

(87) PCT Pub. No.: WO2023/050067
PCT Pub. Date: Apr. 6, 2023

(65) Prior Publication Data
US 2024/0231603 A1 Jul. 11, 2024

(51) Int. Cl.
*G06F 3/046* (2006.01)
*G02F 1/1333* (2006.01)
(Continued)

(52) U.S. Cl.
CPC ...... *G06F 3/04883* (2013.01); *G02F 1/13338* (2013.01); *G06F 3/0412* (2013.01);
(Continued)

(58) Field of Classification Search
CPC .... G06F 3/04883; G06F 3/0412; G06F 3/046; G06F 3/041; G02F 1/133331;
(Continued)

(56) References Cited

U.S. PATENT DOCUMENTS

| 10,712,829 B2 | 7/2020 | Feng et al. |
| 2012/0068984 A1* | 3/2012 | Chen ............ G06F 3/046 345/211 |

(Continued)

FOREIGN PATENT DOCUMENTS

| CN | 201611478 U | 10/2010 |
| CN | 102881274 A | 1/2013 |

(Continued)

OTHER PUBLICATIONS

Written Opinion of PCT/CN2021/121359 dated Jun. 6, 2022, (4p).

Primary Examiner — Adam J Snyder
(74) Attorney, Agent, or Firm — Arch & Lake LLP

(57) ABSTRACT

An array substrate, a panel, a handwriting tablet and a method for driving the same, relate to the field of handwriting tablet technology. The array substrate includes a handwriting area and a peripheral area surrounding the handwriting area; the handwriting area includes a plurality of handwriting sub-areas; wherein the array substrate includes a plurality of NFC coils and a plurality of erasure units. The plurality of NFC coils are arranged in the plurality of (Continued)

handwriting sub-areas in a one-to-one correspondence. The plurality of erasure units are arranged in the plurality of handwriting sub-areas in a one-to-one correspondence.

20 Claims, 10 Drawing Sheets

(51) Int. Cl.
*G06F 3/041* (2006.01)
*G06F 3/04883* (2022.01)
*G02F 1/1343* (2006.01)
*G09G 3/36* (2006.01)

(52) U.S. Cl.
CPC ........ *G06F 3/046* (2013.01); *G02F 1/133331* (2021.01); *G02F 1/1343* (2013.01); *G02F 1/134309* (2013.01); *G06F 3/041* (2013.01); *G09G 3/36* (2013.01)

(58) Field of Classification Search
CPC ........... G02F 1/13338; G02F 1/134309; G02F 1/1343; G09G 3/36
See application file for complete search history.

(56) References Cited

U.S. PATENT DOCUMENTS

| | | | | |
|---|---|---|---|---|
| 2018/0074623 A1* | 3/2018 | Xi | ............................ | G06F 3/046 |
| 2018/0301106 A1* | 10/2018 | Huang | ................. | G09G 3/3677 |
| 2019/0094978 A1 | 3/2019 | Feng et al. | | |
| 2019/0318682 A1* | 10/2019 | Ren | ...................... | G09G 3/2092 |
| 2023/0125764 A1* | 4/2023 | Kim | .................... | G06F 3/04162 |
| | | | | 345/173 |

FOREIGN PATENT DOCUMENTS

| | | | | | |
|---|---|---|---|---|---|
| CN | 104786705 A | | 7/2015 | | |
| CN | 107577374 A | | 1/2018 | | |
| CN | 107632735 A | | 1/2018 | | |
| CN | 107844218 A | | 3/2018 | | |
| CN | 207424833 U | | 5/2018 | | |
| CN | 111158538 A | | 5/2020 | | |
| CN | 111505843 A | | 8/2020 | | |
| CN | 112327546 A | | 5/2021 | | |
| CN | 113076052 A | | 7/2021 | | |
| CN | 114041106 A | | 2/2022 | | |
| JP | S63126354 A | | 5/1988 | | |
| JP | 2001056737 A | | 2/2001 | | |
| WO | WO-2019171019 A1 | * | 9/2019 | .......... | G06K 19/025 |
| WO | 2021014701 A1 | | 1/2021 | | |
| WO | WO-2021150036 A1 | * | 7/2021 | ......... | G02F 1/13338 |

* cited by examiner

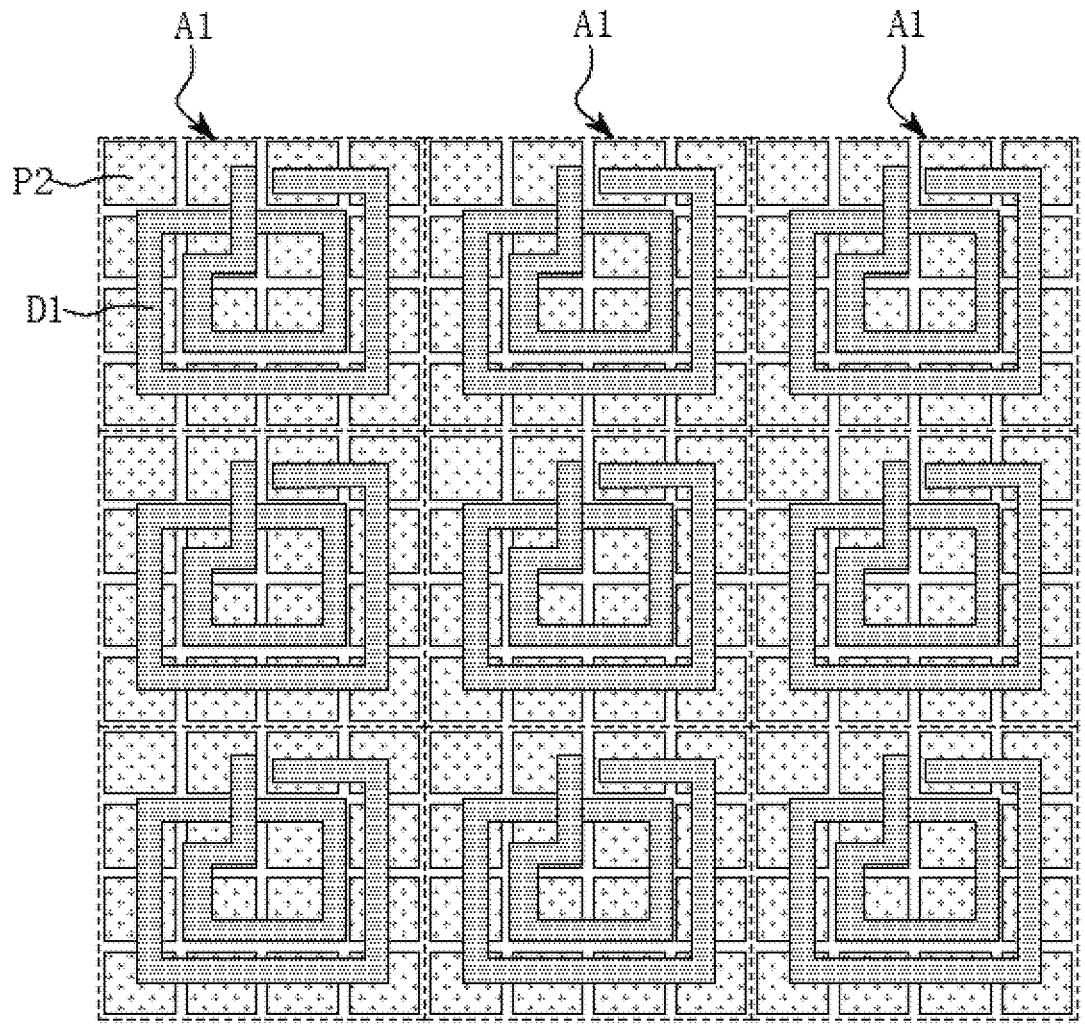

FIG. 15

| Whether a target sensing signal is generated by the NFC coil is detected one by one, wherein the target sensing signal is generated by the NFC coil by sensing the NFC chip | ~S110 |

| In response to generation of the target sensing signal by the NFC coil in a handwriting sub-area, an erasing signal is sent to the erasure unit in the handwriting sub-area, wherein the erasing signal is configured for the erasure unit to respond to erase the written content in the handwriting sub-area | ~S120 |

FIG. 16

ARRAY SUBSTRATE WITH NFC COIL, HANDWRITING TABLET INCLUDING THE SAME, AND METHOD FOR DRIVING HANDWRITING TABLET

CROSS REFERENCE

The present disclosure is a U.S. national phase application of International Application No. PCT/CN2021/121359, filed on Sep. 28, 2021, which is incorporated herein by reference in its entirety.

TECHNICAL FIELD

The present disclosure relates to the field of handwriting tablet technology, and in particular, to an array substrate, a panel, a handwriting tablet and a method for driving the handwriting tablet.

BACKGROUND

With the development of liquid crystal display technology, a liquid crystal handwriting tablet is increasingly used in education, business applications and other fields. A frame of the current handwriting tablet is thick, which cannot sufficiently satisfy requirements for a narrow frame.

It should be noted that information disclosed in above section is only for enhancing understanding of the background of the present disclosure, and therefore may include information that does not form the prior art already known to those of ordinary skill in the art.

SUMMARY

The purpose of the present disclosure is to provide an array substrate, a panel, a handwriting tablet and a method for driving the handwriting tablet.

According to one aspect of the present disclosure, an array substrate is provided, and the array substrate includes a handwriting area and a peripheral area surrounding the handwriting area, wherein the handwriting area includes at least one handwriting sub-area, and an NFC coil and an erasure unit are provided in the at least one handwriting sub-area.

According to some embodiments of the present disclosure, the handwriting area includes a plurality of handwriting sub-areas, and the NFC coil and the erasure unit are provided in each of the plurality of handwriting sub-areas.

According to some embodiments of the present disclosure, the array substrate includes a base substrate, a bottom color layer, and a driving layer arranged in stack, the bottom color layer is arranged on a side of the driving layer close to the base substrate, and the driving layer includes a pixel electrode arranged in an array; and wherein the erasure unit in the handwriting sub-area includes the pixel electrode located in the handwriting sub-area.

According to some embodiments of the present disclosure, the driving layer is provided with a scan line extending in a row direction and a data line extending in a column direction; and the driving layer further includes a thin film transistor electrically connected to the pixel electrode in a one-to-one correspondence, wherein a source of the thin film transistor is electrically connected to the data line, a gate of the thin film transistor is electrically connected to the scan line, and a drain of the thin film transistor is electrically connected to the pixel electrode corresponding to the thin film transistor.

According to some embodiments of the present disclosure, the NFC coil is arranged in the driving layer, and the NFC coil includes a plurality of sub-electrodes; and wherein orthographic projections of the sub-electrodes on the base substrate are located between orthographic projections of the pixel electrodes on the base substrate.

According to some embodiments of the present disclosure, the driving layer includes a gate layer provided with the scan line and a source-drain metal layer provided with the data line, and part of the sub-electrodes are arranged in the gate layer and/or part of the sub-electrodes are arranged in the source-drain metal layer.

According to some embodiments of the present disclosure, the sub-electrodes include a row sub-electrode extending in the row direction and a column sub-electrode extending in the column direction; and wherein the row sub-electrode is located in the gate layer, and the column sub-electrode is located in the source-drain metal layer.

According to some embodiments of the present disclosure, the array substrate further includes a sensing layer, and the NFC coil is located in the sensing layer.

According to some embodiments of the present disclosure, an anti-reflection layer is provided on a side of the sensing layer close to the driving layer.

According to some embodiments of the present disclosure, wiring of the NFC coil at least partially overlaps with the pixel electrode.

According to some embodiments of the present disclosure, an orthographic projection of the wiring of the NFC coil on the base substrate includes an overlapping position, the overlapping position of the orthographic projection of the wiring of the NFC coil is located within an orthographic projection of the pixel electrode on the base substrate, and the overlapping position of the orthographic projection of the wiring of the NFC coil is bridged through the driving layer.

According to some embodiments of the present disclosure, a sensing distance of the NFC coil ranges between 1 and 5 cm.

According to some embodiments of the present disclosure, a sense pad electrically connected to the NFC coil is provided in the peripheral area, and the sense pad is located on the same side of the handwriting area.

According to another aspect of the present disclosure, a handwriting tablet panel is provided, and the handwriting tablet panel includes a cover plate, a liquid crystal layer and above-mentioned array substrate, which are stacked in sequence.

According to some embodiments of the present disclosure, the erasure unit includes a pixel electrode, and the cover plate is provided with a common electrode layer.

According to another aspect of the present disclosure, a handwriting tablet is provided, and the handwriting tablet includes above-mentioned handwriting tablet panel, a control module, and an erasure component with a built-in NFC chip, wherein the control module is electrically connected to the NFC coil and the erasure unit, and the control module is configured to drive, in response to receiving a target sensing signal sent by the NFC coil in a handwriting sub-area, the erasure unit in the handwriting sub-area to erase written content in the handwriting sub-area.

According to another aspect of the present disclosure, a method for driving a handwriting tablet is provided, the method is configured for driving above-mentioned handwriting tablet, and includes: detecting whether a target sensing signal is generated by the NFC coil one by one, wherein the target sensing signal is generated by the NFC coil by sensing the NFC chip; and sending, in response to generation of the target sensing signal by the NFC coil in a handwriting sub-area, an erasing signal to the erasure unit in the handwriting sub-area, wherein the erasing signal is configured for the erasure unit to respond to erase the written content in the handwriting sub-area.

According to some embodiments of the present disclosure, detecting whether a target sensing signal is generated by the NFC coil one by one includes: detecting whether a sensing signal is generated by the NFC coil one by one, wherein detection duration for each NFC coil is a first duration threshold; extending, in response to generation of the sensing signal by the NFC coil in a handwriting sub-area, the detection duration for the NFC coil in the handwriting sub-area to a second duration threshold; and determining whether the sensing signal is the target sensing signal.

It should be understood that the foregoing general description and the following detailed description are exemplary and explanatory only and do not limit the present disclosure.

BRIEF DESCRIPTION OF THE DRAWINGS

The drawings, which are incorporated in and constitute a part of the specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

FIG. 15 is a schematic diagram of a partial top-view structure of an array substrate according to an embodiment of the disclosure, and only a part of the structure is shown.

FIG. 16 is a schematic flowchart of a method for driving a handwriting tablet according to an embodiment of the present disclosure.

DESCRIPTIONS OF REFERENCE NUMERALS

Figure 1:
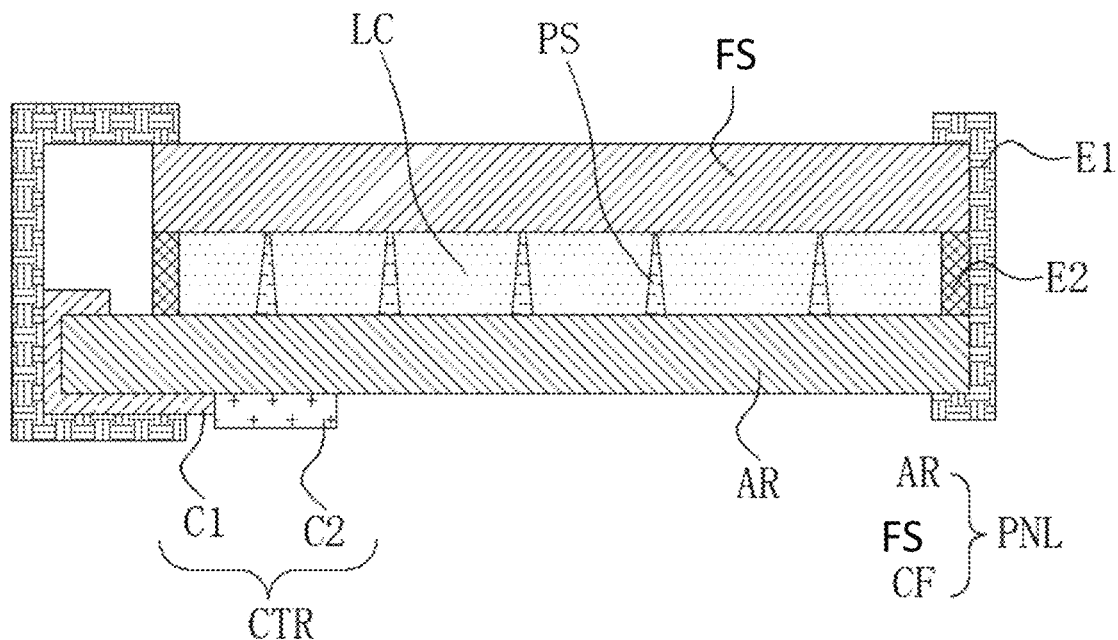
FIG. 1 is a schematic structural diagram of a handwriting tablet according to an embodiment of the present disclosure.

AA, handwriting area; A1, handwriting sub-area; BB, peripheral area; D1, NFC coil; P1, sub-electrode; P11, row sub-electrode; P12, column sub-electrode; D2, erasure unit; P2, pixel electrode; TFT, thin film transistor; DL, data line; GL, scan line; L1, sense line; L2, erasure line; PAD1, sense pad; PAD2, erasure pad; AR, array substrate; LC, liquid crystal layer; FS, cover plate; E1, frame; E2, frame sealant; PS, photo spacer; F100, base substrate; F200, bottom color layer; F300, driving layer; F400, sensing layer; F500, anti-reflection layer.

DETAILED DESCRIPTION

Example embodiments will now be described more fully with reference to the drawings. However, example embodiments can be embodied in various forms and should not be construed as limited to embodiments set forth herein. Rather, these embodiments are provided so that the present disclosure will be thorough and complete, and the concept of example embodiments will be fully conveyed to those skilled in the art. The same reference numerals in the drawings denote the same or similar structures, and thus detailed descriptions thereof will be omitted. Furthermore, the drawings are merely schematic illustrations of the present disclosure and are not necessarily drawn to scale.

Although relative terms such as "upper" and "lower" are used in this specification to describe a relative relationship of one component and another component, these terms are used in this specification only for convenience, for example, according to a direction of the example shown in the drawings. It will be appreciated that if the device illustrated is turned upside down, the component described as "upper" will become the "lower" component. When a certain structure is "on" another structure, it may mean that the certain structure is integrally formed on the other structure, or it may mean that the certain structure is "directly" arranged on the other structure, or that the certain structure is "indirectly" arranged on the other structure through yet another structure.

Terms "a", "an", "the", "said" and "at least one" are used to indicate presence of one or more elements/components/etc. Terms "include" and "comprise" are used to indicate an open-ended inclusion, and mean presence of additional elements/components/etc., in addition to listed elements/components/etc. Terms "first", "second", etc., are used as markings only, instead of limiting the number of objects.

Figure 2:
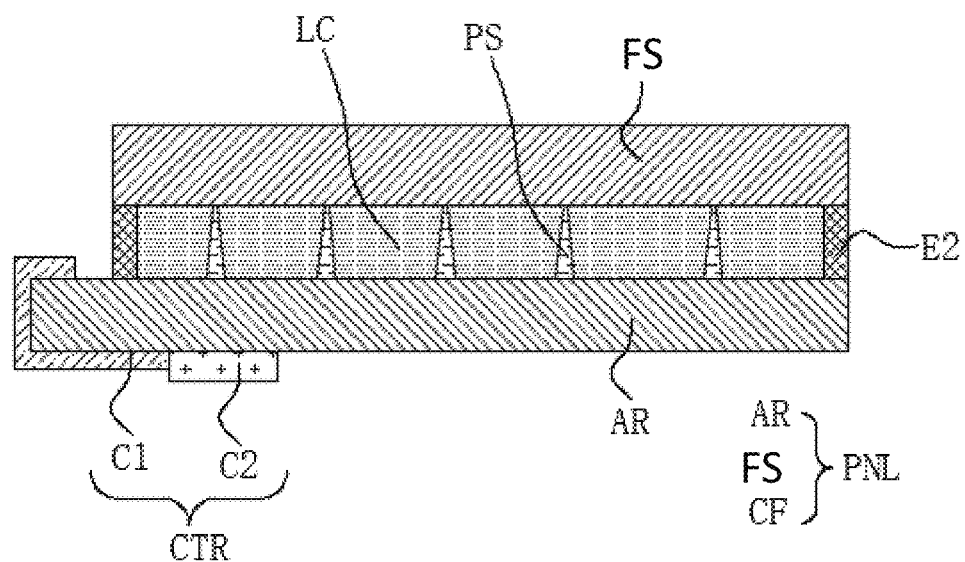
FIG. 2 is a schematic structural diagram of a handwriting tablet according to an embodiment of the present disclosure.

The present disclosure provides a handwriting tablet and a method for driving the handwriting tablet. Referring to FIG. 1 and FIG. 2, the handwriting tablet may include a handwriting tablet panel PNL and a control module CTR for controlling the handwriting tablet panel PNL. The handwriting tablet panel PNL may include an array substrate AR, a liquid crystal layer LC and a cover plate CF that are stacked in sequence.

In some embodiments, the liquid crystal in the liquid crystal layer LC may be liquid crystal with a bistability property, especially, may be bistable cholesteric liquid crystal. In a non-writing state, the cholesteric liquid crystal exhibits a focal conic texture, which scatters weakly to ambient light, making the handwriting tablet appear a bottom color (such as a dark color). When writing with a writing pen or a pencil, the pressure makes the cholesteric liquid crystal transform from the focal conic texture to a planar texture, so that visible light is selectively reflected and a specific color (such as yellow-green) is appeared, thereby displaying corresponding written content.

Figure 3:
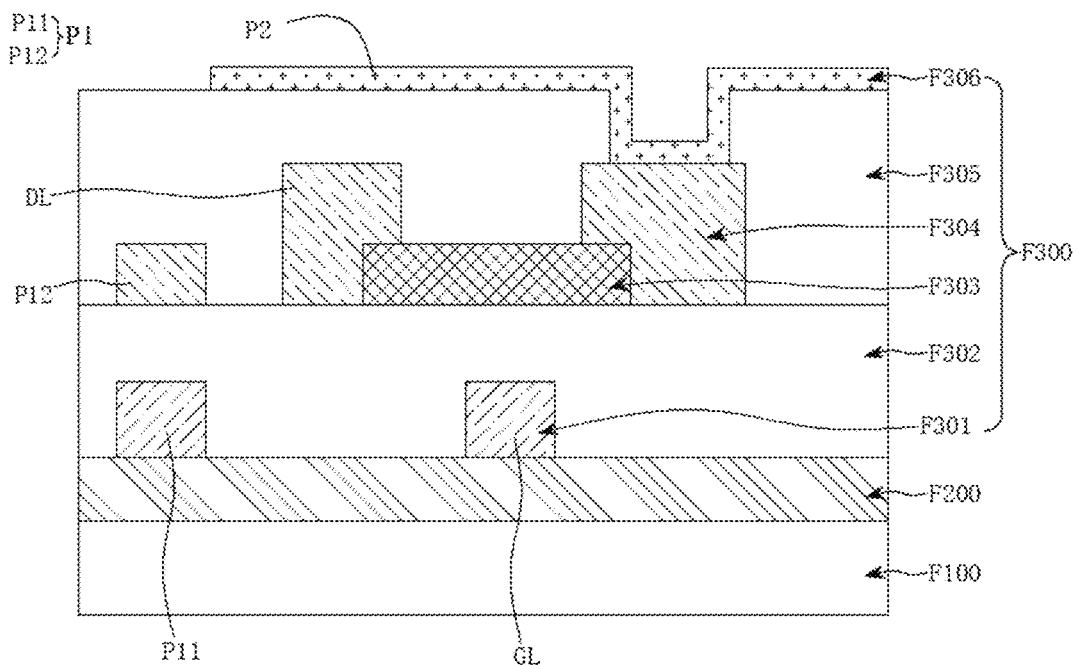
FIG. 3 is a schematic structural diagram of an array substrate according to an embodiment of the present disclosure.
Figure 4:
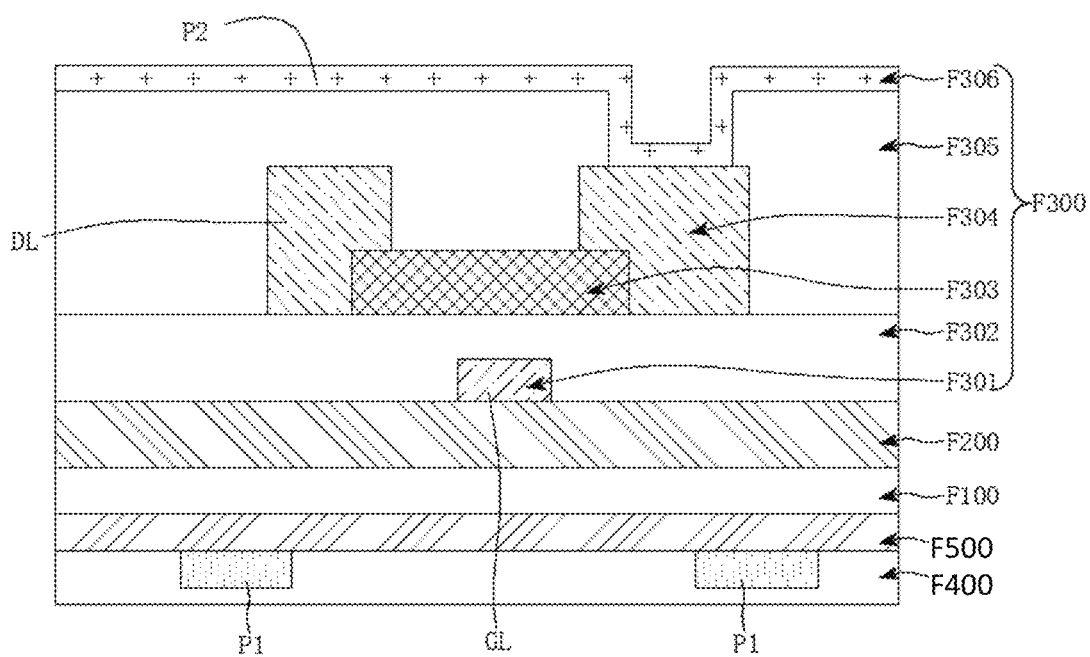
FIG. 4 is a schematic structural diagram of an array substrate according to an embodiment of the present disclosure.

Referring to FIG. 3 and FIG. 4, the array substrate AR may be provided thereon with a pixel electrode P2 controlled by the control module CTR. The cover plate CF is provided with a common electrode layer (not shown in the figure). The liquid crystal layer LC is sandwiched between the pixel electrode P2 and the common electrode layer. When an erasure voltage is applied between the pixel electrode P2 and the common electrode layer, an electric field between the pixel electrode P2 and the common electrode layer may restore the liquid crystal to the focal conic texture to achieve erasing of the written content.

In some embodiments, the cover plate CF may include a flexible base, and the common electrode layer is arranged on a side of the flexible base close to the liquid crystal layer LC. In this way, when the cover plate CF is pressed, the cover plate CF can be deformed to squeeze the liquid crystal, so that the liquid crystal is transformed to the planar texture.

In some embodiments, the cover plate CF may further include an alignment layer located on a side (inner side) of the common electrode layer away from the flexible base.

In some embodiments, the handwriting tablet panel PNL may further include a photo spacer PS located between the array substrate AR and the cover plate CF, so as to facilitate maintaining a thickness of a liquid crystal cell. The photo spacer PS may be a silicon ball, a plastic ball, a resin ball, etc., or may be a resin pillar and a resin bump pre-formed on the array substrate AR or on the cover plate CF.

Referring to FIG. 1 and FIG. 2, the handwriting tablet panel PNL may further include frame sealant E2 located between the array substrate AR and the cover plate CF. The frame sealant E2 may be arranged around a handwriting area AA of the handwriting tablet panel PNL to seal the liquid crystal layer LC and to connect the array substrate AR with the cover plate CF.

Figure 5:
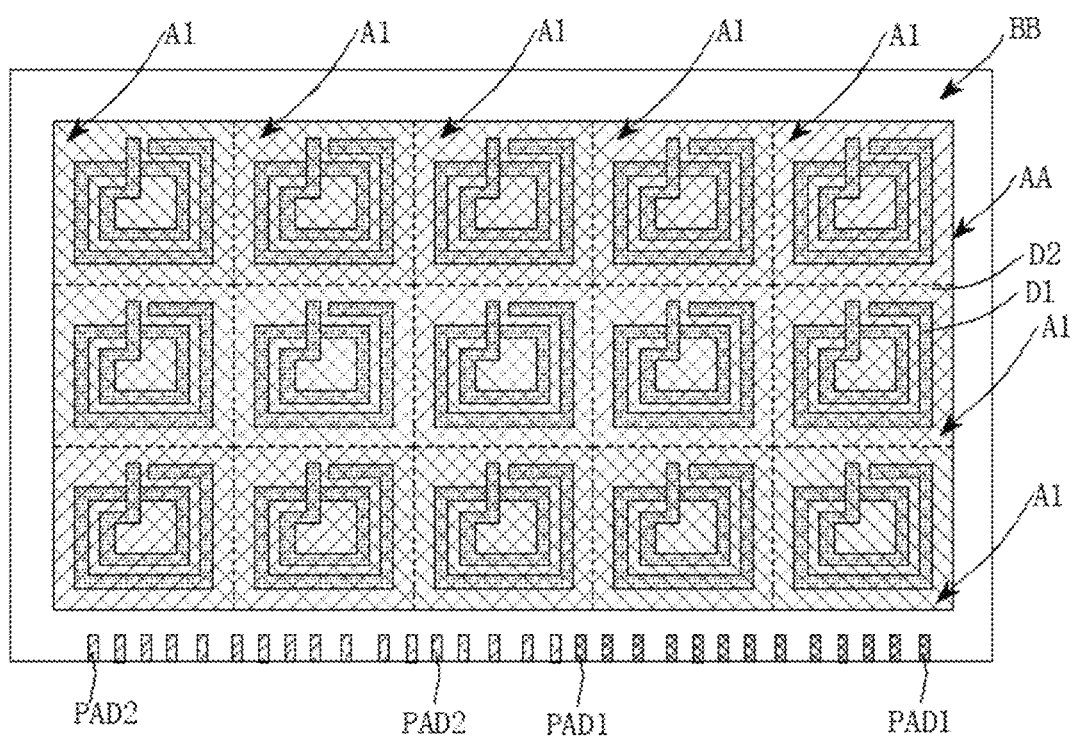
FIG. 5 is a schematic diagram of a top-view structure of an array substrate according to an embodiment of the present disclosure.

Referring to FIG. 5, the array substrate AR includes a handwriting area AA and a peripheral area BB surrounding the handwriting area AA. The handwriting area AA includes at least one handwriting sub-area A1. In some embodiments of the present disclosure, the handwriting area AA includes a plurality of handwriting sub-areas A1. In the handwriting area AA, a written pattern can be formed by pressing (for example, through a finger or a pen, etc.).

In at least one handwriting sub-area A1, the array substrate AR is provided with an NFC coil and an erasure unit. In some embodiments of the present disclosure, the array substrate AR includes a plurality of NFC (Near Field Communication) coils D1 and a plurality of erasure units D2. The plurality of NFC coils D1 are arranged in the plurality of handwriting sub-areas A1 in a one-to-one correspondence. The plurality of erasure units D2 are arranged in the plurality of handwriting sub-areas A1 in a one-to-one correspondence. In other words, each handwriting sub-area A1 is provided with one NFC coil D1 and one erasure unit D2. The erasure unit D2 in the handwriting sub-area A1 includes a pixel electrode P2 located in the handwriting sub-area A1. In the handwriting tablet, a control module CTR is electrically connected to each of the NFC coils D1 and each of the erasure units D2. The control module CTR is configured to drive the erasure unit D2 in the handwriting sub-area A1, after receiving a target sensing signal sent by the NFC coil D1 in the handwriting sub-area A1, to erase the written content in the handwriting sub-area A1.

In some embodiments, the array substrate AR may further include a sense pad PAD1 electrically connected to the NFC coil D1, and the control module CTR may be electrically connected to the sense pad PAD1 to receive a sensing signal from the NFC coil D1. The array substrate AR may further include an erasure pad PAD2 electrically connected to the erasure unit D2, and the control module CTR may be electrically connected to the erasure pad PAD2 to drive the erasure unit D2 to erase the written content in the handwriting sub-area A1.

In the related art, an infrared positioning method is usually used to determine an area to be erased. In such method, the handwriting tablet needs a larger frame to accommodate infrared components (an infrared transmitter and an infrared receiver). As a result, a frame size of a current handwriting tablet is large. The handwriting tablet according to embodiments of the present disclosure can reduce a thickness of the handwriting tablet by realizing areal positioning and partial erasing, which eliminates the need to arrange infrared components in the frame, thereby greatly reducing the frame size and increasing a screen percentage of the handwriting tablet.

Not only that, the frame needs to protrude outwards, so that the infrared components can be accommodated in front of the handwriting tablet panel PNL, thereby realizing positioning and operation in front of the handwriting tablet panel PNL, which will significantly increase a thickness of the handwriting tablet panel PNL. While according to embodiments of the present disclosure, the NFC coil D1 is arranged in the array substrate AR, and there is no need to arrange the positioning components in the frame. As a result, the handwriting tablet provided by embodiments of the present disclosure can reduce the thickness of the handwriting tablet by realizing areal positioning and partial erasing, which can also eliminate the need to arrange infrared components, thereby reducing the power consumption of the handwriting tablet.

In some embodiments of the present disclosure, referring to FIG. 1, the handwriting tablet may also be provided with a frame E1. In the frame E1, positioning components such as infrared components may not be provided, so that a thickness of the frame E1 is reduced, especially a height of the frame E1 protruding from the handwriting tablet panel PNL is reduced, and the overall exterior of the handwriting tablet is improved.

In some other embodiments of the present disclosure, referring to FIG. 2, the handwriting tablet may be not provided with a frame, so as to further reduce the thickness of the handwriting tablet and increase an area percentage of the handwriting area, thereby realizing ultra-narrow edge and ultra-thinness of the handwriting tablet.

In some embodiments of the present disclosure, the control module CTR may include a circuit distribution structure C1 and a control circuit C2. The circuit distribution structure C1 may be bounded and connected with the sense pad PAD1 and the erasure pad PAD2, and is electrically connected to the control circuit C2, so that the control circuit C2 can interact with the NFC coil D1 and the erasure unit D2 through the circuit distribution structure. In some embodiments, the circuit distribution structure may include a circuit board or a flexible circuit board, or may be a flexible film provided with wiring. The control circuit can receive a signal from the NFC coil D1 and send the signal to the erasure unit D2, so as to realize control of the handwriting tablet. The control circuit may include a printed circuit board connected to the circuit distribution structure, a chip, a single-chip microcomputer, a microprocessor, or other circuits capable of realizing control functions.

In some embodiments of the present disclosure, the control module CTR may include a first control module for controlling the NFC coil D1 and a second control module for controlling the erasure unit D2, and the first control module and the second control module can interact with each other. For example, the control module CTR may include an NFC control circuit board as the first control module. The NFC control circuit board may be electrically connected to each sense pad PAD1, and control an electrical connection between each NFC coil D1 and the NFC circuit board to be turned on one by one. When the electrical connection between the NFC coil D1 and the NFC circuit board is turned on, the NFC circuit board can receive the signal from the NFC coil D1. For example, the NFC circuit board receives a sensing signal and determine whether the sensing signal is a target sensing signal.

In some other embodiments of the present disclosure, the control module CTR may be a module that integrates with both monitoring of the NFC coil D1 and controlling of the erasure unit D2 functions, and pins of the control module may be electrically connected to the sense pad PAD1 and the erasure pad PAD2, especially the sense pad PAD1 and the erasure pad PAD2 can be in mixed arrangement according to requirements.

The handwriting tablet provided by embodiments of the present disclosure further includes an erasure component with a built-in NFC chip. The erasure component may be a board eraser, an eraser, an erasure pen and other articles with the built-in NFC chip. When the NFC coil D1 in any handwriting sub-area A1 senses the NFC chip, the NFC coil D1 may send a sensing signal (as a target sensing signal) to the control module CTR. The control module CTR may send an erasing signal to the erasure unit D2 in the handwriting sub-area A1, to drive the erasure unit D2 to erase the written content in the handwritten sub-area A1, thereby realizing erasing of the written content in a specific handwritten sub-area A1. In other words, the handwriting tablet according to embodiments of the present disclosure is provided with the NFC coil D1 thereon, and thus positioning of an area to be erased and selectively erasing of the written content in the area to be erased can be achieved.

Figure 6:
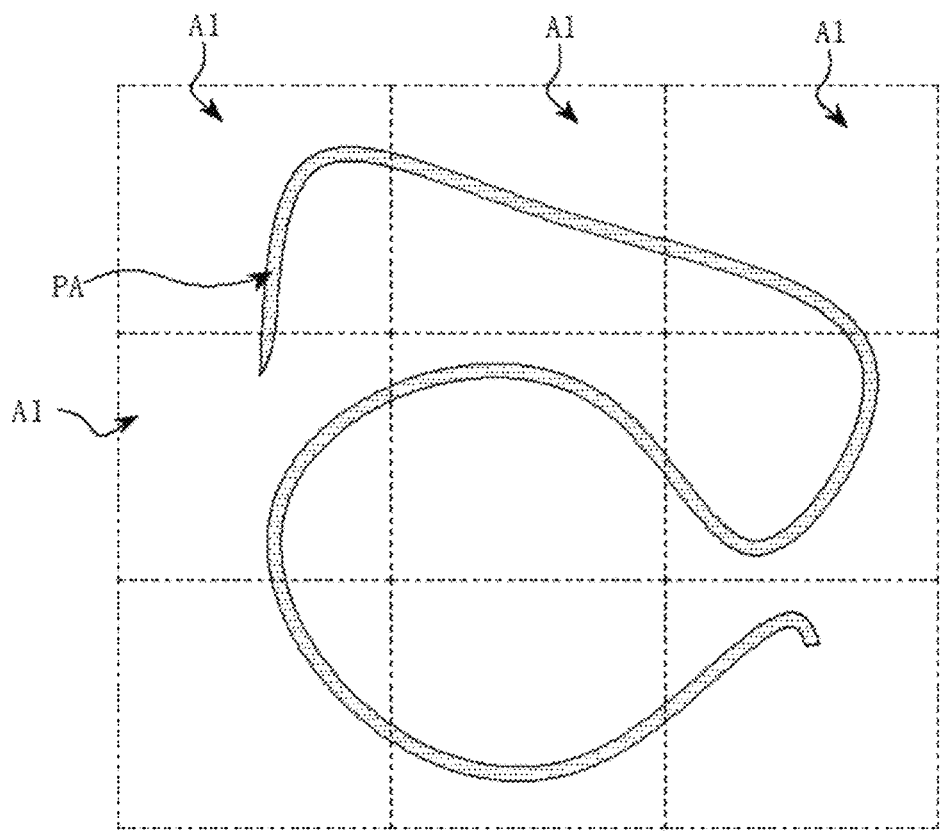
FIG. 6 is a schematic diagram of displaying written content in a handwriting area of a handwriting tablet according to an embodiment of the present disclosure.

Referring to FIG. 6, when a user needs to write content on the handwriting tablet, he/she can press the handwriting tablet with a finger, a writing pen, etc. The liquid crystal in the area of the handwriting tablet being pressed is transformed into the planar texture, and then reflects a specific color to form written imprints, so as to present the written content PA.

Figure 7:
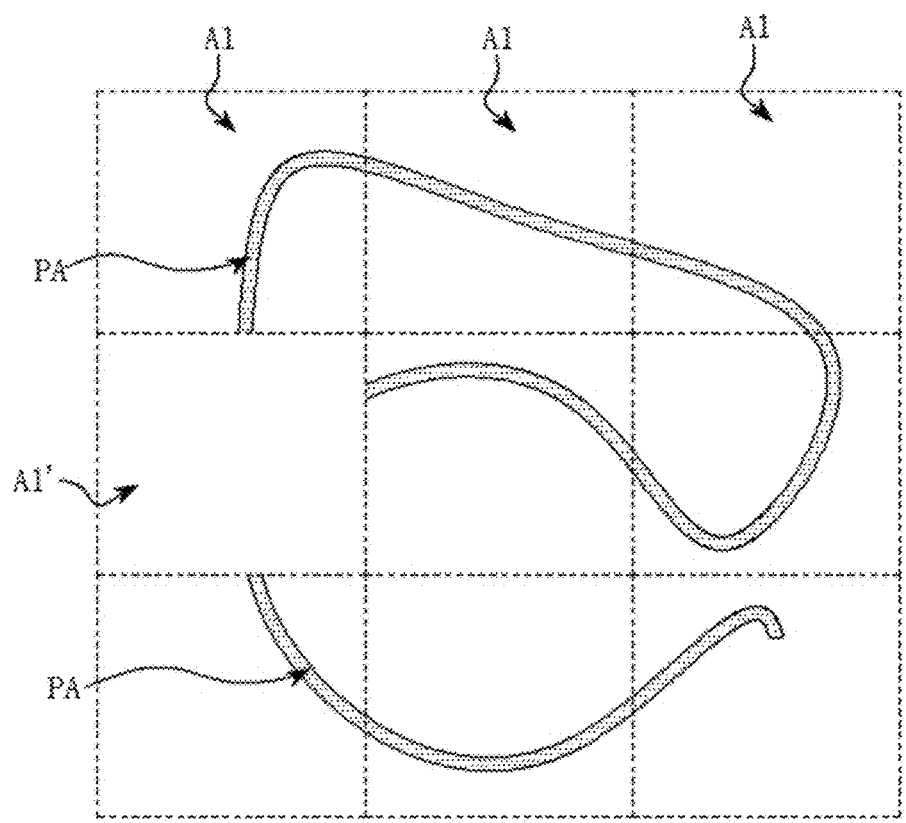
FIG. 7 is a schematic diagram of erasing written content in a specific handwriting sub-area of a handwriting tablet according to an embodiment of the present disclosure.

Referring to FIG. 7, when the written content in a specific handwriting sub-area A1' needs to be erased, an article with an NFC chip may be brought close to the specific handwriting sub-area A1', the NFC coil D1 in the specific handwriting sub-area A1' then senses the NFC chip to generate a target sensing signal and sends the target sensing signal to the control module CTR. The control module CTR may send an erasing signal to the erasure unit D2 in the specific handwriting sub-area A1' in response to the sensing signal from the specific handwriting sub-area A1'. Under the action of the erasure unit D2 in the specific handwriting sub-area A1', the liquid crystal in the specific handwriting sub-area A1' is transformed into the focal conic texture, and then changes from a reflective state to a scattering state, so that the specific handwriting sub-area A1' presents a bottom color, and the written content in the specific handwriting sub-area A1' is erased.

In some embodiments, referring to FIG. 16, the handwriting tablet provided by embodiments of the present disclosure can be driven according to a following driving method to erase the written content in the specific handwriting sub-area A1'.

In a step S110, whether a target sensing signal is generated by the NFC coil D1 is detected one by one. The target sensing signal is generated by the NFC coil D1 by sensing the NFC chip.

In a step S120, in response to generation of the target sensing signal by the NFC coil D1 in a handwriting sub-area A1, an erasing signal is sent to the erasure unit D2 in the handwriting sub-area A1. The erasure unit D2 can respond to the erasing signal to erase the written content in the handwriting sub-area A1.

In some embodiments of the present disclosure, step S110 can be implemented by following steps.

The NFC coil D1 is detected one by one to determine whether a sensing signal is generated, and detection duration for each NFC coil D1 is a first duration threshold. If it is detected that an NFC coil D1 in a handwriting sub-area A1 generates a sensing signal, the detection duration for the NFC coil D1 is extended to a second duration threshold, and then whether the sensing signal is the target sensing signal is determined.

In this way, the control module CTR can cyclically detect the NFC coil D1 one by one. In a case where a sensing signal has not been generated by the NFC coil D1, the detection duration for the NFC coil D1 is only a short first duration threshold. As a result, a cycle period during detection can be reduced, thereby shortening a time interval between two adjacent detections of the same NFC coil D1, and improving a response speed of the control module CTR to the NFC chip. In a cycle detection process, if it is detected that an NFC coil D1 in a (any) handwriting sub-area A1 generates a sensing signal, the detection duration for the NFC coil D1 in the handwriting sub-area A1 is automatically extended to a longer second duration threshold, so that the control module CTR can receive the sensing signal fully and determine whether the sensing signal is the target sensing signal, which can improve the sensing accuracy to the NFC chip and avoid false erasure caused by external electromagnetic interference, and in addition, which can also allow the control module CTR to have enough time to drive a corresponding erasure unit D2 to ensure that the written content in the handwriting sub-area A1 corresponding to the NFC coil D1 is completely erased. As a result, the method for driving the handwriting tablet provided by embodiments of the present disclosure can achieve a balance between improving the response speed and improving the positioning accuracy.

In some embodiments of the present disclosure, in the step S110, when the NFC coil D1 is detected one by one to determine whether a target sensing signal is generated, a connection between the NFC coil D1 and the control module CTR can be turned on one by one. When the connection between the NFC coil D1 and the control module CTR is turned on, the control module CTR can receive the signal from the NFC coil D1.

In some embodiments of the present disclosure, referring to FIG. 5, the handwriting area AA may be divided into a plurality of handwriting sub-areas A1, thus the handwriting area AA is composed of the plurality of handwriting sub-areas A1. In some embodiments, each of different areas of the handwriting area AA has an NFC coil D1 and an erasure unit D2 corresponding thereto, and the written content of which can be selectively erased in response to the NFC chip.

In some embodiments of the present disclosure, the handwriting sub-area A1 is rectangular, and an edge of the handwriting sub-area A1 may extend in a row direction or a column direction, which facilitates the division of the handwriting sub-area A1. In other embodiments of the present disclosure, the handwriting sub-area A1 may also have other shapes, for example, a hexagon, a triangle, etc.

In some embodiments of the present disclosure, sizes of different handwriting sub-areas A1 may be the same. In other embodiments of the present disclosure, different handwriting sub-areas A1 may have different sizes or shapes.

Exemplarily, in some embodiments of the present disclosure, the handwriting area AA is divided into a plurality of handwriting sub-areas A1 arranged in an array, and each of the plurality of handwriting sub-areas A1 is rectangular and has the same size.

Referring to FIGS. 3 and 4, the array substrate AR may include a stacked base substrate F100, a bottom color layer F200 and a driving layer F300. The bottom color layer F200 is arranged on a side of the driving layer F300 close to the base substrate F100. In some embodiments, the bottom color layer F200 may be arranged between the driving layer F300 and the base substrate F100. In other embodiments, the bottom color layer F200 may be arranged on a side of the base substrate F100 away from the driving layer F300. For example, a bottom color film may be used as the bottom color layer F200 and may be attached to a back side of the base substrate F100 (a side away from the driving layer F300).

A pixel electrode P2 may be arranged in the driving layer F300. In some embodiments, the handwriting sub-area A1 may include one or more pixel electrodes P2. An erasure unit D2 in the handwriting sub-area A1 may include each of the pixel electrodes P2 located in the handwriting sub-area A1. Further, the pixel electrode P2 is arranged in the driving layer F300 in an array.

A material of the base substrate F100 may be an inorganic material or an organic material. For example, in some embodiments of the present disclosure, the material of the base substrate F100 may be a glass material such as soda-lime glass, quartz glass, sapphire glass, etc., or may be a metal material such as stainless steel, aluminum, nickel, etc. In some other embodiments of the present disclosure, the material of the base substrate F100 may be polymethyl methacrylate (PMMA), polyvinyl phenol (PVP), polyether sulfone (PES), polyimide, polyamide, polyacetal, Polycarbonate (PC), Polyethylene terephthalate (PET), Polyethylene naphthalate (PEN) or a combination thereof. In some other embodiments of the present disclosure, the base substrate F100 may also be a flexible base substrate F100, for example, the material of the base substrate F100 may be polyimide (PI). In some embodiments, the material of the base substrate F100 may also be a composite of multi-layer materials. For example, in some embodiments of the present disclosure, the base substrate F100 may include a bottom film layer, a pressure-sensitive adhesive layer, a first polyimide layer and a second polyimide layer, which are stacked in sequence.

In some embodiments, the bottom color layer F200 may be a film layer with high absorptivity to reduce the reflection of light, thereby making the bottom color layer F200 appear dark color, such as black or dark blue. The bottom color of the handwriting tablet can be dark color. Exemplarily, the bottom color layer F200 may be a black resin layer or a black plastic layer.

In some embodiments of the present disclosure, the pixel electrode P2 may be driven by means of an active driving method or a passive driving method. For example, in some embodiments of the present disclosure, the pixel electrode P2 may be directly connected to an erasure pad PAD2 through an erasure line, and electrically connected to the control module CTR through the erasure pad PAD2. In this way, the control module CTR can drive each pixel electrode P2 in a passive driving manner. That is, an erasure voltage is loaded as an erasing signal to the pixel electrode P2 in the passive driving manner.

Figure 12:
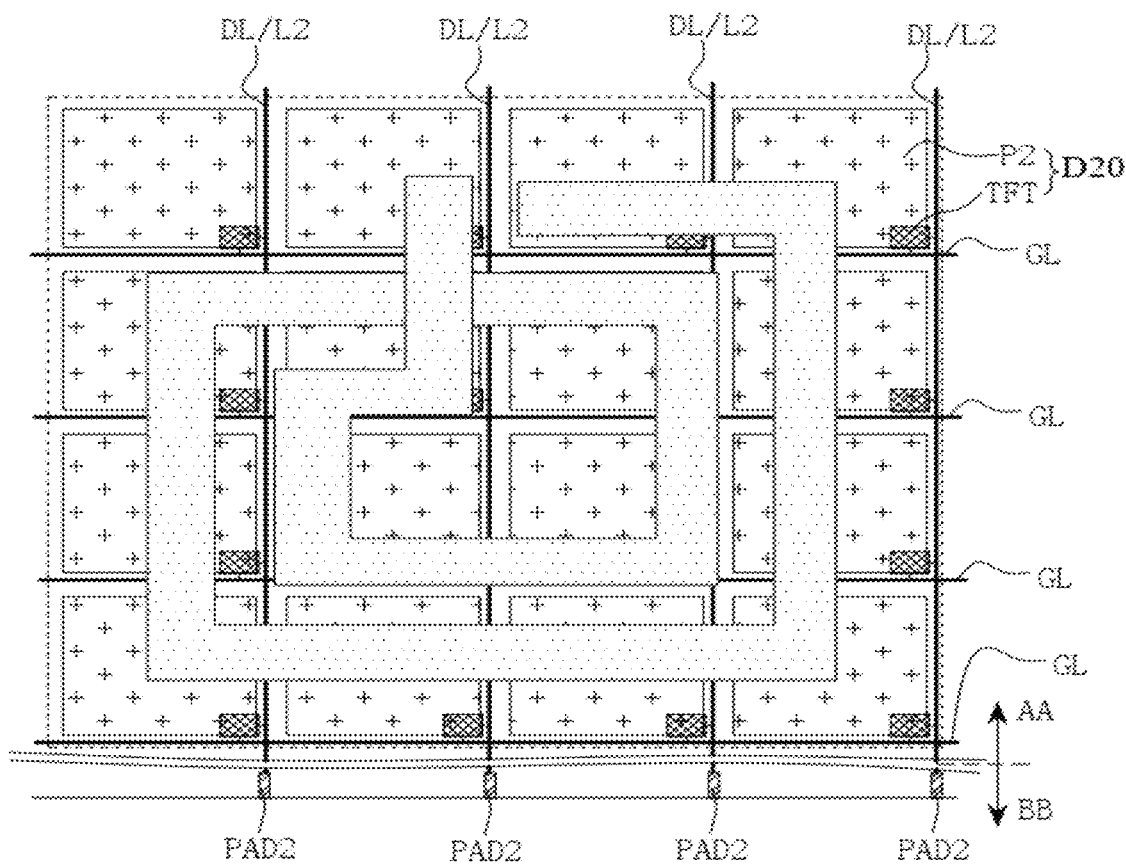
FIG. 12 is a schematic diagram of a partial top-view structure of an array substrate according to an embodiment of the disclosure, and only a part of the structure is shown.

For another example, in some embodiments of the present disclosure, the driving layer F300 further includes a switch element (for example, transistors such as thin film transistors) electrically connected to each pixel electrode P2 in a one-to-one correspondence, and a scan line GL extending in the row direction and a data line DL extending in the column direction. Referring to FIG. 12, a thin film transistor TFT is taken as the switch element as an example, and the erasure unit D2 in the handwriting sub-area A1 also includes a thin film transistor TFT connected to each pixel electrode P2 in a one-to-one correspondence. A gate of the thin film transistor TFT is connected to the scan line GL, a drain of the thin film transistor TFT is connected to the pixel electrode P2, and a source of the thin film transistor TFT is connected to the data line DL. In this way, the control module CTR can drive each pixel electrode P2 in the erasure unit D2 by row-by-row scanning in an active driving manner. That is, an erasure voltage is loaded as an erasing signal to the pixel electrode P2 in the active driving manner. In other words, referring to FIG. 12, the erasure unit D2 in the handwriting sub-area A1 may include one or more erasure sub-units D20, and each of the erasure sub-units D20 includes a thin film transistor TFT and the pixel electrode P2 to which the thin film transistor TFT is electrically connected. When an erasure voltage needs to be applied to a pixel electrode P2, a scanning signal can be applied to the scan line GL corresponding to the pixel electrode P2, and the erasure voltage can be applied to the data line DL corresponding to the pixel electrode P2. In this way, the thin film transistor TFT connected to the pixel electrode P2 is turned on in response to the scanning signal, and the erasure voltage on the data line DL is loaded to the pixel electrode P2. In some embodiments, the data line DL may be used as the erasure line and may be electrically connected to the erasure pad PAD2.

In some embodiments of the present disclosure, referring to FIG. 15, for any handwriting sub-area A1, a plurality of pixel electrodes P2 arranged in an array is included. In some cases, the erasing precision can be improved by adjusting the driving method. In some other cases, the erasing process of the pattern in the handwriting sub-area A1 can be controlled by controlling the power-on (loading of the erasure voltage) sequence of each pixel electrode P2 in the handwriting sub-area A1. As a result, the similarity degree between the handwriting tablet and a real blackboard/whiteboard is improved by displaying the erasing process, thereby further improving the user experience.

For example, in some embodiments of the present disclosure, step S120 may be implemented by the following steps.

When it is detected that an NFC coil D1 in a specific handwriting sub-area A1' generates a target sensing signal, the pixel electrodes P2 in the specific handwriting sub-area A1' are driven row by row. When a pixel electrode P2 in the specific handwriting sub-area A1' is driven, a scanning signal is applied to the scan line GL connected to the thin film transistor TFT corresponding to the pixel electrode P2, and an erasure voltage is loaded to the data line DL connected to the thin film transistor TFT corresponding to the pixel electrode P2.

Further, the pixel electrodes P2 in the specific handwriting sub-area A1' can be driven row by row in an order from top to bottom (from an end away from the erasure pad PAD2 to an end close to the erasure pad PAD2). In some embodiments, the pixel electrodes P2 in the specific handwriting sub-area A1' can also be driven in other sequences, for example, driven row by row from bottom to top, or sequentially driven from one diagonal corner (a top corner) to another diagonal corner (a top corner not adjacent).

In the following, a structure of film layers of the driving layer F300 is exemplarily introduced by taking the driving layer F300 capable of realizing active driving as an example.

In some examples, the driving layer may include a transistor layer and a pixel electrode layer which are arranged in stack. The transistor layer is located between the pixel electrode layer and the base substrate. The pixel electrodes are arranged in the pixel electrode layer, and the transistor layer is provided with thin film transistors electrically connected to the pixel electrodes in a one-to-one correspondence. The thin film transistor can be selected from a top gate thin film transistor, a bottom gate thin film transistor or a double gate thin film transistor. A material of an active layer of the thin film transistor can be amorphous silicon semiconductor materials, low temperature polysilicon semiconductor materials, metal oxide semiconductor materials, organic semiconductor materials or other types of semiconductor materials. The thin film transistor can be an N-type thin film transistor or a P-type thin film transistor. A transistor may have a source, a drain, and a gate. It can be understood that the source and the drain of a transistor are two opposite concepts that can be converted to each other. When an operating state of the transistor changes, for example, when a current direction changes, the source and the drain of the transistor can be interchanged.

In some examples, referring to FIGS. 3 and 4, the transistor layer may include a gate layer F301, a gate insulating layer F302, a semiconductor layer F303, a source-drain metal layer F304, etc., which are stacked between the bottom color layer F200 and the pixel electrode layer F306. The positional relationship between these film layers can be determined according to the structure of film layers of the thin film transistor. Further, the active layer of the thin film transistor may be formed in the semiconductor layer F303. The wirings of the gate layer such as the scan line GL and the gate of the thin film transistor may be formed in the gate layer F301. The wirings of the source-drain metal layer such as the data line DL may be formed in the source-drain metal layer F304.

In some embodiments of the present disclosure, the driving layer F300 may further include a passivation layer F305. The passivation layer F305 may be arranged on a surface of the source-drain metal layer F304 away from the base substrate F100 to protect the source-drain metal layer F304.

In some embodiments of the present disclosure, a structural layer A is located on a side of a structural layer B away from the base substrate. It can be understood that the structural layer A is formed on the side of the structural layer B away from the base substrate. When the structural layer B is a patterned structure, part of the structural layer A may also be located at the same physical height of the structural layer B or lower than the physical height of the structure layer B, and the base substrate is taken as a height reference.

In some embodiments of the present disclosure, the driving layer F300 may further include a planarization layer located between the source-drain metal layer F304 and the pixel electrode layer F306. The planarization layer may provide a planarized surface for the pixel electrode. In some embodiments, a material of the planarization layer may be organic materials.

In some embodiments of the present disclosure, the driving layer F300 may further include an interlayer dielectric layer. The interlayer dielectric layer is located on sides of the semiconductor layer, the gate layer and other film layers away from the base substrate, and the source-drain metal layer F304 is located on a side of the interlayer dielectric layer away from the base substrate.

For example, in some embodiments of the present disclosure, referring to FIGS. 3 and 4, the driving layer F300 may include a gate layer F301, a gate insulating layer 302, a semiconductor layer F303, a source-drain metal layer F304, a passivation layer F305, and a pixel electrode layer F306. The thin film transistor thus formed is a bottom gate thin film transistor.

In some embodiments of the present disclosure, a material of the pixel electrode layer F306 may be a light-transmitting material, that is, the pixel electrode P2 may be a transparent electrode. In this way, the reflection of the pixel electrode can be reduced, which is beneficial to the clear display of the pattern. In some embodiments of the present disclosure, the material of the pixel electrode layer may be a metal oxide, such as ITO (indium tin oxide).

In some embodiments of the present disclosure, the NFC coil D1 can be arranged in the driving layer F300. In other words, the NFC coil D1 and the driving layer F300 can share a metal layer, and especially can be prepared in a common process.

In some embodiments of the present disclosure, referring to FIG. 3, a pixel electrode P2 and a thin film transistor TFT for driving the pixel electrode P2 are arranged in the driving layer F300. The driving layer F300 has a gate layer F301 and a source-drain metal layer F304. The scan line GL connected to the thin film transistor TFT may be arranged in the gate layer F301 and extend in a row direction. The data line DL connected to the thin film transistor TFT may be arranged in the source-drain metal layer and extend in a column direction. The NFC coil D1 may be composed of a plurality of sub-electrodes P1. Some of the sub-electrodes are arranged in the gate layer F301 and/or some of the electrodes are arranged in the source-drain metal layer F304. In some embodiments of the present disclosure, part of the sub-electrodes (e.g., P11 in FIG. 3) are arranged in the gate layer F301, and part of the electrodes (e.g., P12 in FIG. 3) are arranged in the source-drain metal layer F304. In this way, the NFC coil D1 can be bridged between the gate layer F301 and the source-drain metal layer F304, and can be routed without affecting the scan line GL and the data line DL.

In some embodiments, the NFC coil D1 may not overlap with the pixel electrode P2. That is, the NFC coil D1 may be arranged in a gap between pixel electrodes P2, so as to avoid adversely affecting the erasing. That is, a sub-electrode P1 can be arranged between the pixel electrodes P2. An orthographic projection of the sub-electrode P1 on the base substrate is located between orthographic projections of the pixel electrodes P2 on the base substrate. In some embodiments of the present disclosure, when it is described that a structure A overlaps with a structure B, it means that the structure A and the structure B are located in different film layers, and an orthographic projection of the structure A on the base substrate at least partially coincides with an orthographic projection of the structure B on the base substrate.

Figure 13:
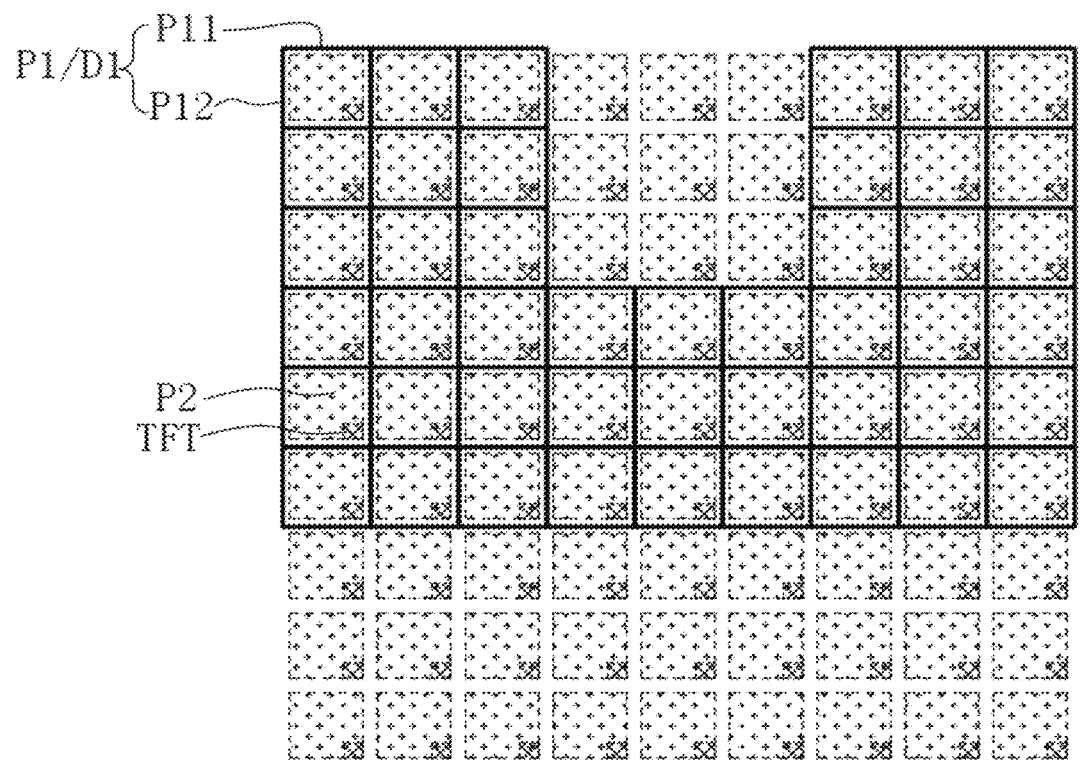
FIG. 13 is a schematic diagram of a partial top-view structure of an array substrate according to an embodiment of the disclosure, and only a part of the structure is shown.

In some embodiments, referring to FIG. 13, the sub-electrode P1 includes a row sub-electrode P11 extending in the row direction and a column sub-electrode P12 extending in the column direction. The row sub-electrode P11 is located in the gate layer F301, and the column sub-electrode P12 is located in the source-drain metal layer. The row sub-electrode P11 and the column sub-electrode P12 are connected through a via hole.

In some other embodiments of the present disclosure, referring to FIG. 4, the array substrate AR may further include a sensing layer F400 for arranging the NFC coil D1. The sensing layer F400 is provided with one conductive layer or a plurality of conductive layers, and the wiring of the NFC coil D1 can be formed through these conductive layers. Further, referring to FIGS. 8 to 11, the NFC coil D1 and the sense pad PAD1 are connected through a sense line L1, and part or all of the sense line L1 may also be formed in the sensing layer F400.

The sensing layer F400 may be arranged on a side of the base substrate F100 away from the bottom color layer F200, or arranged between the base substrate F100 and the bottom color layer F200, or arranged between the driving layer F300 and the bottom color layer F200. In some embodiments, referring to FIG. 4, an anti-reflection layer F500 may also be provided on a side of the sensing layer F400 close to the driving layer F300 to reduce the luminosity of the NFC coil D1 in the sensing layer F400, thereby improving the display effect.

In some embodiments of the present disclosure, an anti-reflection film and the sensing layer F400 may be attached in sequence to a side of the base substrate F100 away from the driving layer F300, and the sensing layer F400 may be a thin film with the NFC coil D1.

In some embodiments, the NFC coil D1 may adopt a hollowed-out wiring or a non-hollowed-out wiring. In some examples, the wiring of the NFC coil D1 is the non-hollowed-out wiring.

Further, referring to FIG. 12, a width of the wiring of the NFC coil D1 may be greater than the gap between the pixel electrode P2. In other words, the wiring of the NFC coil D1 may at least partially overlap with the pixel electrode P2. Since the NFC coil D1 is located below the driving layer F300 (close to a side of the base substrate F100), even if the wiring of the NFC coil D1 has a large area, and overlaps with the pixel electrode P2, the pixel electrode P2 would not be disturbed by the NFC coil D1.

Figure 14:
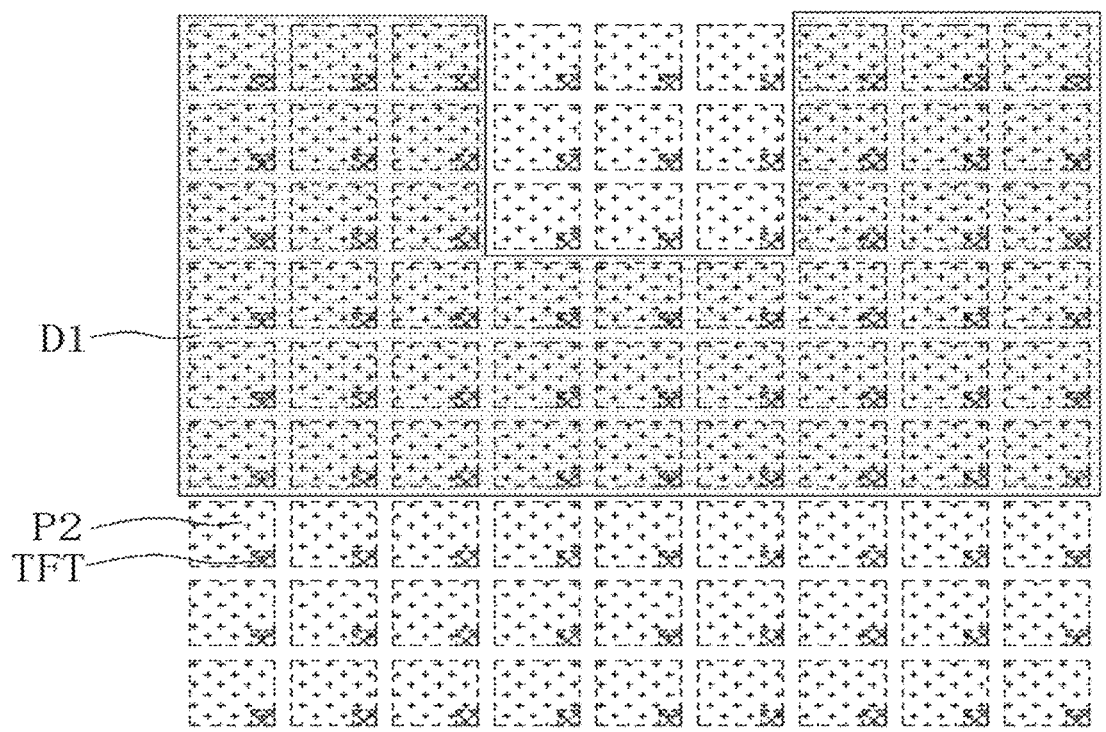
FIG. 14 is a schematic diagram of a partial top-view structure of an array substrate according to an embodiment of the disclosure, and only a part of the structure is shown.

For example, referring to FIG. 14, on a plane parallel to the base substrate, the width of the NFC coil D1 is greater than a size of the pixel electrode P2.

For another example, referring to FIG. 12, on a plane parallel to the base substrate, the width of the wiring of the NFC coil D1 is greater than the width of the gap between the pixel electrode P2 and not greater than the width of the pixel electrode P2.

In some embodiments of the present disclosure, referring to FIG. 12, an orthographic projection of the wiring of the NFC coil on the base substrate includes an overlapping position, and the overlapping position of the orthographic projection of the wiring of the NFC coil is located within the orthographic projection of pixel electrode on the base substrate. The overlapping position of the orthographic projection of the wiring of the NFC coil is bridged through the driving layer. In other words, the NFC coil D1 includes at least one loop of wiring. The overlapping position of the wiring of the NFC coil D1 overlaps with the pixel electrode P2. At the overlapping position of the wiring of the NFC coil D1, the wiring of the NFC coil D1 is bridged through the driving layer F300. In some other embodiments of the present disclosure, the sensing layer F400 may also include a plurality of conductive layers, and the wiring of the NFC coil D1 is bridged between the plurality of conductive layers of the sensing layer F400.

In some embodiments of the present disclosure, a pattern of each NFC coil D1 may not be exactly the same. For example, there may be differences in the number of turns, width, wiring length, etc., of the NFC coil D1. In some embodiments, the pattern of the NFC coils D1 in each handwriting sub-area A1 can be adjusted so that a sensing distance of each NFC coil D1 is the same or substantially the same. In some embodiments of the present disclosure, the sensing distance of the NFC coil D1 ranges between 1 and 5 cm.

In some embodiments, the pattern of the NFC coil D1 can also be adjusted based on the properties of the sense line L1 connected to the NFC coil D1, such as a length, a width, impedance, etc. The pattern of the NFC coil D1 is adjusted in such away that the magnetic flux of each NFC coil D1 is substantially the same, or each NFC coil D1 basically sends the same signal when the NFC chip is sensed.

In some embodiments of the present disclosure, a sense area of the NFC coil D1 can be adjusted by adjusting the number of turns, width, and spacing of the NFC coil D1, so that the sense area of the NFC coil D1 is located in a corresponding handwriting sub-area A1.

In some embodiments of the present disclosure, the NFC coil D1 is connected to the sense pad PAD1 through the sense line L1. The control module CTR is connected with the sense pad PAD1, and can receive the signal from the NFC coil D1. The sense pad PAD1 may be arranged in the peripheral area BB, that is, outside the handwriting area AA. The sense pads PAD1 may be arranged on the same side of the handwriting area AA, or may be located on different sides of the handwriting area AA. For example, the peripheral area BB may include four different sub-areas surrounding the handwriting area AA, and the sense pads PAD1 may all be located in the same sub-area, or may be distributed in two adjacent or opposite sub-areas, or may be distributed in three sub-areas, or in all four sub-areas.

In some embodiments, taking the handwriting area AA as a rectangular area as an example, distribution of the sense pads PAD1 in the peripheral area BB will be exemplarily described. In some embodiments, the handwriting area AA is a rectangular area, the peripheral area BB surrounds the handwriting area AA, and is divided based on positions of four different edges of the handwriting area AA, into four sub-areas connected in sequence at the beginning and end, namely a first peripheral sub-area, a second peripheral sub-area, a third peripheral sub-area, and a fourth peripheral sub-area.

Figure 8:
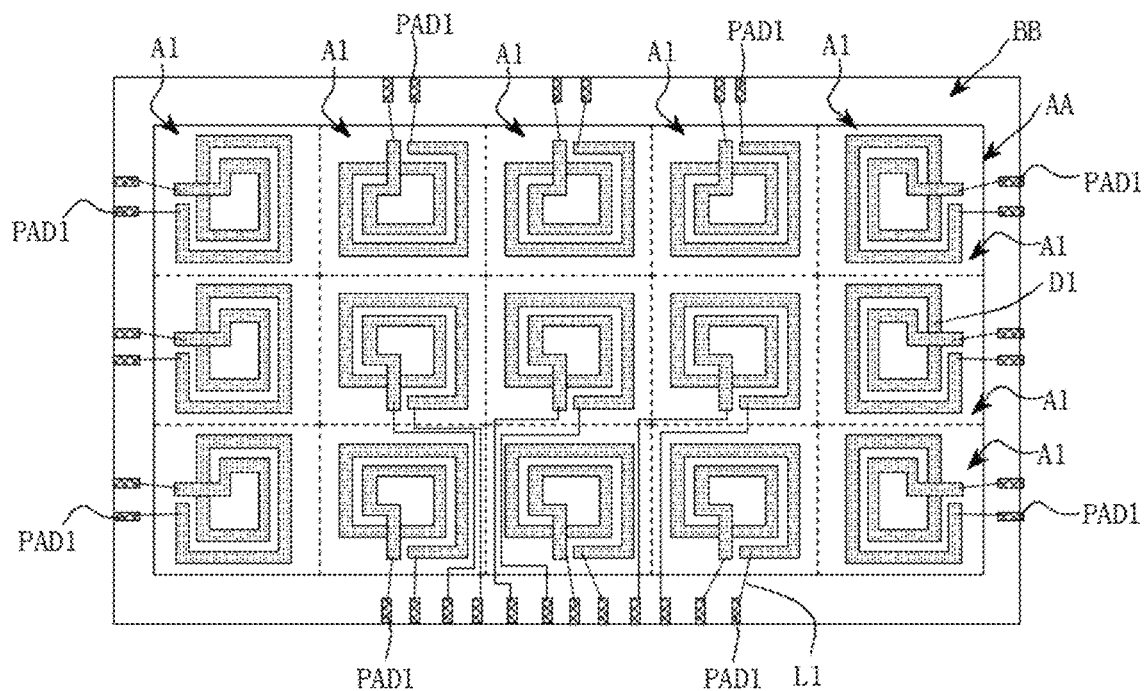
FIG. 8 is a schematic diagram of a top-view structure of an array substrate according to an embodiment of the present disclosure.

In some embodiments of the present disclosure, referring to FIG. 8, the first peripheral sub-area, the second peripheral sub-area, the third peripheral sub-area, and the fourth peripheral sub-area are all provided with sense pads PAD1. Further, the NFC coil D1 located at the edge and close to the first peripheral sub-area is connected to the sense pad PAD1 located in the first peripheral sub-area through the sense line L1; the NFC coil D1 located at the edge and close to the second peripheral sub-area is connected to the sense pad PAD1 located in the second peripheral sub-area through the sense line L1; the NFC coil D1 located at the edge and close to the third peripheral sub-area is connected to the sense pad PAD1 located in the third peripheral sub-area through the sense line L1; the NFC coil D1 located at the edge and close to the fourth peripheral sub-area is connected to the sense pad PAD1 located in the fourth peripheral sub-area through the sense line L1. The NFC coil D1 not located at the edge can be connected to the sense pad PAD1 in a close area through the sense line L1.

Figure 9:
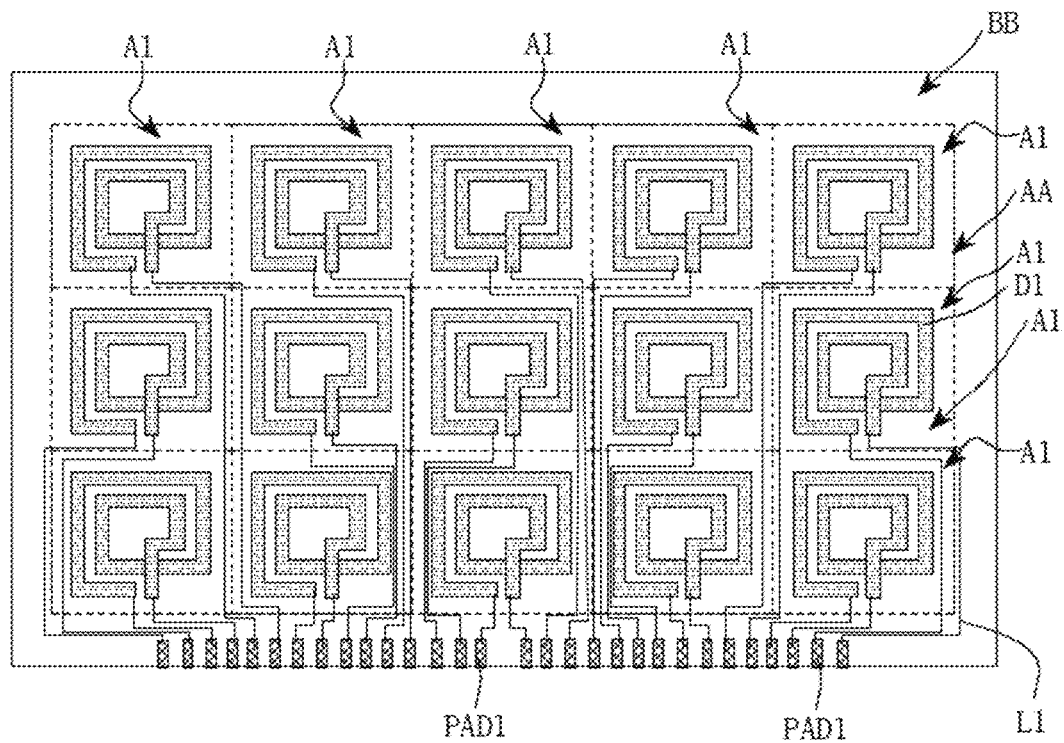
FIG. 9 is a schematic diagram of a top-view structure of an array substrate according to an embodiment of the present disclosure.

In some other embodiments of the present disclosure, referring to FIG. 9, the sense pads PAD1 are all arranged in the first peripheral sub-area. Each NFC coil D1 is electrically connected to the sense pad PAD1 through the sense line L1. Further, the sense line L1 may be connected to the sense pad PAD1 through the peripheral area BB or the gap between the pixel electrode P2. In this way, the positions of the sense pads PAD1 are relatively concentrated, which facilitates a binding connection between the sense pads PAD1 and the circuit board of the control module CTR.

In some other solutions, an erasure pad PAD2 is further provided in the first peripheral sub-area, and the erasure pad PAD2 is connected to the erasure unit D2. Exemplarily, the erasure pad PAD2 electrically connected to each data line DL in a one-to-one correspondence is provided in the first peripheral sub-area, so as to be connected to the circuit board of the control module CTR.

In some other solutions, the first peripheral sub-area is located at an end of the array substrate AR in the column direction.

Figure 10:
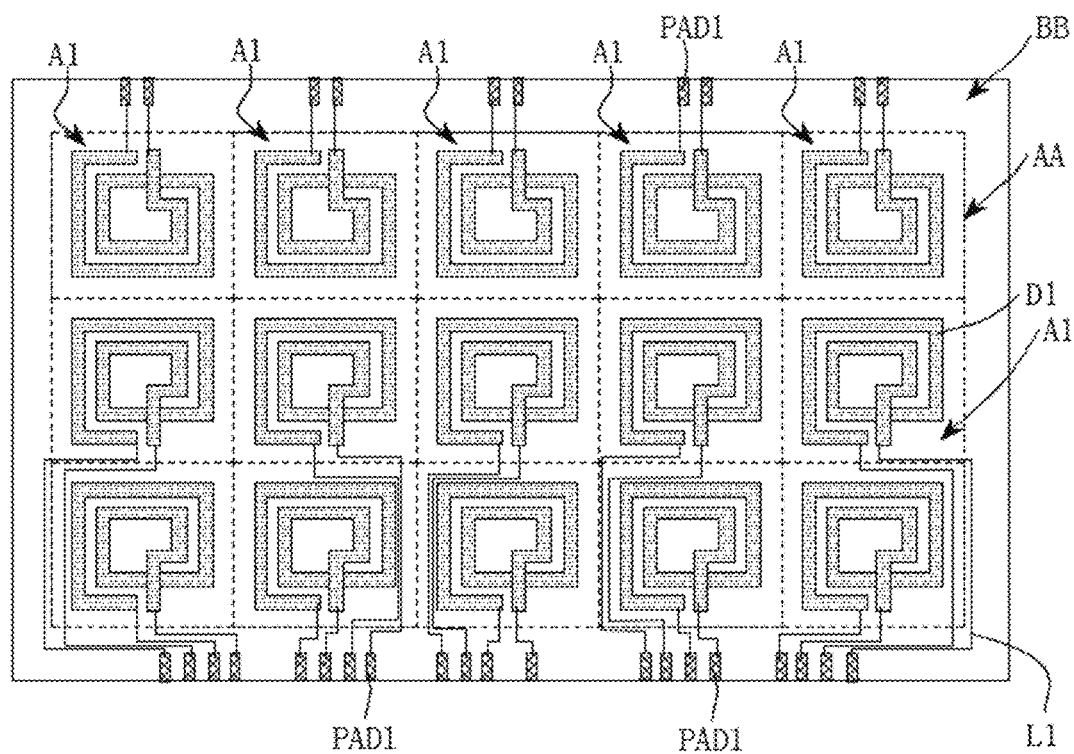
FIG. 10 is a schematic diagram of a top-view structure of an array substrate according to an embodiment of the present disclosure.

In some other embodiments of the present disclosure, referring to FIG. 10, the sense pad PAD1 may be arranged in the first peripheral sub-area and the third peripheral sub-area. Further, the NFC coil D1 close to the third peripheral sub-area can be electrically connected to the sense pad PAD1 located in the third peripheral sub-area through the sense line L1, and the remaining NFC coil D1 can be electrically connected to the sense pad PAD1 located in the first peripheral sub-area through the sense line L1.

Figure 11:
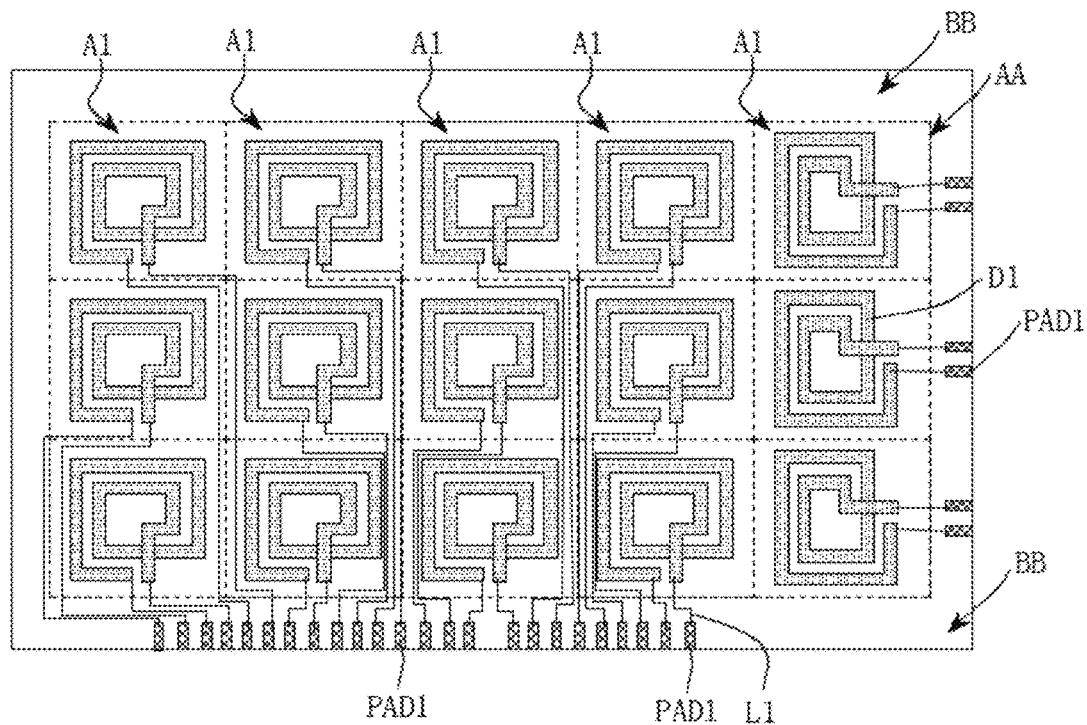
FIG. 11 is a schematic diagram of a top-view structure of an array substrate according to an embodiment of the present disclosure.

In some other embodiments of the present disclosure, referring to FIG. 11, the sense pad PAD1 may be arranged in the first peripheral sub-area and the second peripheral sub-area. Further, the NFC coil D1 close to the second peripheral sub-area can be electrically connected to the sense pad PAD1 located in the second peripheral sub-area through the sense line L1, and the remaining NFC coil D1 can be connected to the sense pad PAD1 located in the first peripheral sub-area through the sense line L1.

It should be noted that although steps of the method for driving the handwriting tablet in the present disclosure are described in a specific order in the drawings, this does not require or imply that these steps must be performed in the specific order, or that all steps shown must be performed to achieve the desired result. Additionally or alternatively, some steps can be omitted, multiple steps can be combined into one step for execution, and/or one step can be decomposed into multiple steps for execution, and the like.

Other embodiments of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, the true scope and spirit of the disclosure being indicated by the appended claims.

What is claimed is:

1. An array substrate comprising a handwriting area and a peripheral area surrounding the handwriting area, wherein the handwriting area comprises at least one handwriting sub-area, and an NFC coil and an erasure unit are provided in the at least one handwriting sub-area; and
    wherein the array substrate further comprises a base substrate, a bottom color layer, and a driving layer arranged in stack, the driving layer comprises a pixel electrode arranged in an array, the NFC coil comprises a first NFC coil, and the first NFC coil is arranged in the driving layer;
    wherein the first NFC coil comprises a plurality of sub-electrodes, and orthographic projections of the plurality of sub-electrodes on the base substrate are all located between orthographic projections of the pixel electrodes on the base substrate;
    wherein the array substrate further comprises a sensing layer, the NFC coil comprises a second NFC coil, and the second NFC coil is located in the sensing layer; and
    wherein an orthographic projection of the wiring of the second NFC coil on the base substrate comprises an overlapping position, the overlapping position of the orthographic projection of the wiring of the second NFC coil is located within an orthographic projection of the pixel electrode on the base substrate, and the overlapping position of the orthographic projection of the wiring of the second NFC coil is bridged through the driving layer.

2. The array substrate according to claim 1, wherein the handwriting area comprises a plurality of handwriting sub-areas, and the NFC coil and the erasure unit are provided in each of the plurality of handwriting sub-areas.

3. The array substrate according to claim 1, wherein the bottom color layer is arranged on a side of the driving layer close to the base substrate, and the erasure unit in the handwriting sub-area comprises the pixel electrode located in the handwriting sub-area.

4. The array substrate according to claim 3, wherein the driving layer is provided with a scan line extending in a row direction and a data line extending in a column direction; and
    the driving layer further comprises a thin film transistor electrically connected to the pixel electrode in a one-to-one correspondence, wherein a source of the thin film transistor is electrically connected to the data line, a gate of the thin film transistor is electrically connected to the scan line, and a drain of the thin film transistor is electrically connected to the pixel electrode corresponding to the thin film transistor.

5. The array substrate according to claim 1, wherein the driving layer comprises a gate layer provided with the scan line and a source-drain metal layer provided with the data line, and part of the sub-electrodes are arranged in the gate layer and/or part of the sub-electrodes are arranged in the source-drain metal layer.

6. The array substrate according to claim 5, wherein the sub-electrodes comprise a row sub-electrode extending in the row direction and a column sub-electrode extending in the column direction; and wherein the row sub-electrode is located in the gate layer, and the column sub-electrode is located in the source-drain metal layer.

7. The array substrate according to claim 1, wherein an anti-reflection layer is provided on a side of the sensing layer close to the driving layer.

8. The array substrate according to claim 1, wherein wiring of the second NFC coil at least partially overlaps with the pixel electrode.

9. The array substrate according to claim 1, wherein a sensing distance of the NFC coil ranges between 1 and 5 cm.

10. The array substrate according to claim 1, wherein a sense pad electrically connected to the NFC coil is provided in the peripheral area, and the sense pad is located on the same side of the handwriting area.

11. A handwriting tablet comprising a handwriting tablet panel, a control module, and an erasure component with a built-in NFC chip, wherein the handwriting tablet panel comprises a cover plate, a liquid crystal layer and an array substrate which are stacked in sequence; and wherein the array substrate comprises a handwriting area and a peripheral area surrounding the handwriting area, wherein the handwriting area comprises at least one handwriting sub-area, and an NFC coil and an erasure unit are provided in the at least one handwriting sub-area; and wherein the array substrate further comprises a base substrate, a bottom color layer, and a driving layer arranged in stack, the driving layer comprises a pixel electrode arranged in an array, the NFC coil comprises a first NFC coil, and the first NFC coil is arranged in the driving layer;

wherein the first NFC coil comprises a plurality of sub-electrodes, and orthographic projections of the plurality of sub-electrodes on the base substrate are all located between orthographic projections of the pixel electrodes on the base substrate;

wherein the array substrate further comprises a sensing layer, the NFC coil comprises a second NFC coil, and the second NFC coil is located in the sensing layer;

wherein an orthographic projection of the wiring of the second NFC coil on the base substrate comprises an overlapping position, the overlapping position of the orthographic projection of the wiring of the second NFC coil is located within an orthographic projection of the pixel electrode on the base substrate, and the overlapping position of the orthographic projection of the wiring of the second NFC coil is bridged through the driving layer; and wherein the control module is electrically connected to the NFC coil and the erasure unit, and the control module is configured to drive, in response to receiving a target sensing signal sent by the NFC coil in the handwriting sub-area, the erasure unit in the handwriting sub-area to erase written content in the handwriting sub-area.

12. The handwriting tablet according to claim 11, wherein the bottom color layer is arranged on a side of the driving layer close to the base substrate, and the erasure unit in the handwriting sub-area comprises the pixel electrode located in the handwriting sub-area.

13. The handwriting tablet according to claim 12, wherein the driving layer is provided with a scan line extending in a row direction and a data line extending in a column direction; and the driving layer further comprises a thin film transistor electrically connected to the pixel electrode in a one-to-one correspondence, wherein a source of the thin film transistor is electrically connected to the data line, a gate of the thin film transistor is electrically connected to the scan line, and a drain of the thin film transistor is electrically connected to the pixel electrode corresponding to the thin film transistor.

14. The handwriting tablet according to claim 11, wherein the driving layer comprises a gate layer provided with the scan line and a source-drain metal layer provided with the data line, and part of the sub-electrodes are arranged in the gate layer and/or part of the sub-electrodes are arranged in the source-drain metal layer.

15. The handwriting tablet according to claim 14, wherein the sub-electrodes comprise a row sub-electrode extending in the row direction and a column sub-electrode extending in the column direction; and wherein the row sub-electrode is located in the gate layer, and the column sub-electrode is located in the source-drain metal layer.

16. The handwriting tablet according to claim 11, wherein an anti-reflection layer is provided on a side of the sensing layer close to the driving layer.

17. The handwriting tablet according to claim 11, wherein wiring of the second NFC coil at least partially overlaps with the pixel electrode.

18. The handwriting tablet according to claim 11, wherein a sensing distance of the NFC coil ranges between 1 and 5 cm.

19. A method for driving a handwriting tablet comprising a handwriting tablet panel, a control module, and an erasure component with a built-in NFC chip, wherein the handwriting tablet panel comprises a cover plate, a liquid crystal layer and an array substrate which are stacked in sequence; and wherein the array substrate comprises a handwriting area and a peripheral area surrounding the handwriting area, wherein the handwriting area comprises at least one handwriting sub-area, and an NFC coil and an erasure unit are provided in the at least one handwriting sub-area; and wherein the array substrate further comprises a base substrate, a bottom color layer, and a driving layer arranged in stack, the driving layer comprises a pixel electrode arranged in an array, the NFC coil comprises a first NFC coil, and the first NFC coil is arranged in the driving layer; and wherein the first NFC coil comprises a plurality of sub-electrodes, and orthographic projections of the plurality of sub-electrodes on the base substrate are all located between orthographic projections of the pixel electrodes on the base substrate;

wherein the control module is electrically connected to the NFC coil and the erasure unit, and the control module is configured to drive, in response to receiving a target sensing signal sent by the NFC coil in the handwriting sub-area, the erasure unit in the handwriting sub-area to erase written content in the handwriting sub-area;

wherein the array substrate further comprises a sensing layer, the NFC coil comprises a second NFC coil, and the second NFC coil is located in the sensing layer; and wherein an orthographic projection of the wiring of the second NFC coil on the base substrate comprises an overlapping position, the overlapping position of the orthographic projection of the wiring of the second NFC coil is located within an orthographic projection of the pixel electrode on the base substrate, and the overlapping position of the orthographic projection of the wiring of the second NFC coil is bridged through the driving layer;

the method comprising:
- detecting whether a target sensing signal is generated by the NFC coil one by one, wherein the target sensing signal is generated by the NFC coil by sensing the NFC chip; and
- sending, in response to generation of the target sensing signal by the NFC coil in a handwriting sub-area, an erasing signal to the erasure unit in the handwriting sub-area, wherein the erasing signal is configured for the erasure unit to respond to erase the written content in the handwriting sub-area.

20. The method for driving a handwriting tablet according to claim 19, wherein detecting whether a target sensing signal is generated by the NFC coil one by one comprises:
- detecting whether a sensing signal is generated by the NFC coil one by one, wherein detection duration for each NFC coil is a first duration threshold;
- extending, in response to generation of the sensing signal by the NFC coil in a handwriting sub-area, the detection duration for the NFC coil in the handwriting sub-area to a second duration threshold; and
- determining whether the sensing signal is the target sensing signal.

* * * * *

UNITED STATES PATENT AND TRADEMARK OFFICE
CERTIFICATE OF CORRECTION

PATENT NO. : 12,333,134 B2  
APPLICATION NO. : 17/916019  
DATED : June 17, 2025  
INVENTOR(S) : Xiaojuan Wu et al.

Page 1 of 1

It is certified that error appears in the above-identified patent and that said Letters Patent is hereby corrected as shown below:

On the Title Page

Item (73) Second Assignee information should read:
BOE Technology Group Co., Ltd.

Signed and Sealed this  
Second Day of September, 2025

Coke Morgan Stewart  
*Acting Director of the United States Patent and Trademark Office*